United States Patent [19]

Iuchi

[11] 4,172,383
[45] Oct. 30, 1979

[54] METHOD AND AN APPARATUS FOR SIMULTANEOUS MEASUREMENT OF BOTH TEMPERATURE AND EMISSIVITY OF A HEATED MATERIAL

[75] Inventor: Tohru Iuchi, Kawasaki, Japan

[73] Assignee: Nippon Steel Corporation, Tokyo, Japan

[21] Appl. No.: 893,311

[22] Filed: Apr. 4, 1978

[30] Foreign Application Priority Data

Apr. 4, 1977 [JP] Japan .................................. 52-38390
Dec. 20, 1977 [JP] Japan .................................. 52-153447

[51] Int. Cl.² .......................... G01J 5/10; G01K 13/06
[52] U.S. Cl. .............................................. 73/355 EM
[58] Field of Search ...................... 73/355 R, 355 EM

[56] References Cited

U.S. PATENT DOCUMENTS

| | | | |
|---|---|---|---|
| 3,057,200 | 10/1962 | Wood | 73/355 EM |
| 3,433,052 | 3/1969 | Maley | 73/355 R |
| 3,796,099 | 3/1974 | Shimotsuma | 73/355 EM |

Primary Examiner—S. Clement Swisher
Attorney, Agent, or Firm—Wenderoth, Lind & Ponack

[57] ABSTRACT

A black body furnace and a radiation thermometer are spaced from each other in the direction of the surface of a heated material the temperature and emissivity of which is to be measured so as to be in a specular, or mirror-like, symmetry to a line normal to the heated material and the wavelength band of the detector of the radiation thermometer is selected such that the surface of the material shows specular, or mirror-like, reflection characteristics. The radiation energy emitted from the black body furnace is changed and the outputs of the radiation thermometer responding to the change are processed whereby the emissivity and surface temperature of the material are obtained. The use of this invention makes it possible to measure accurately the temperature of the material without any disturbance, even if the emissivity of the material is changed in the course of the measurement.

18 Claims, 11 Drawing Figures

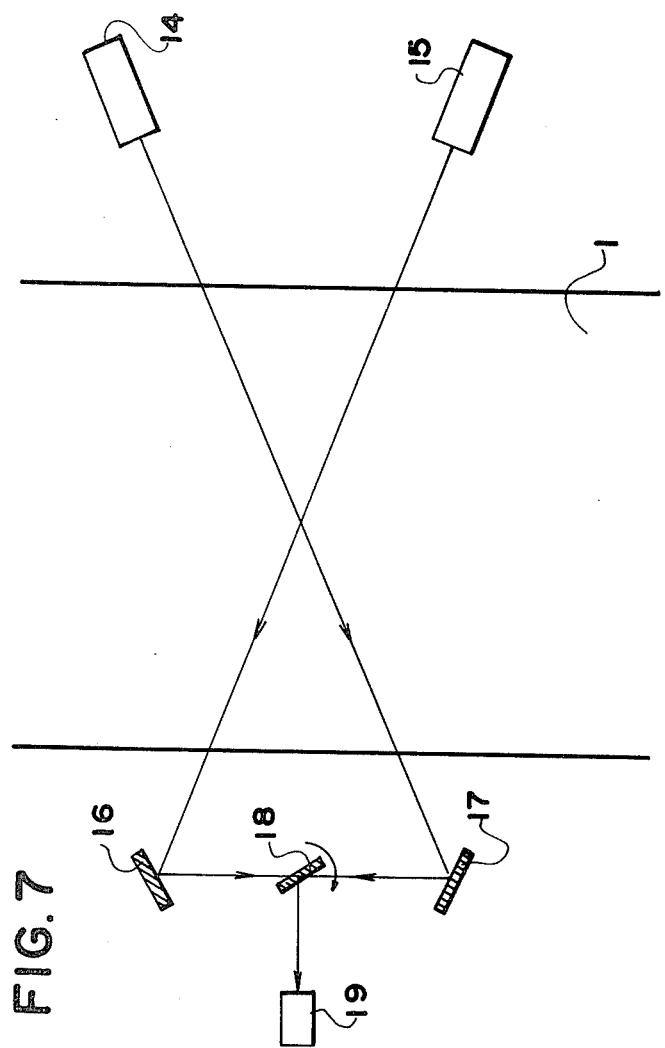

METHOD AND AN APPARATUS FOR SIMULTANEOUS MEASUREMENT OF BOTH TEMPERATURE AND EMISSIVITY OF A HEATED MATERIAL

DETAILED DESCRIPTION OF THE INVENTION

This invention relates to a method and an apparatus for the accurate measurement of the surface temperature of a heated material such as a heated steel sheet, the emissivity of which changes with the passage of time, by measuring the emissivity of the material simultaneously with the temperature by radiation thermometry, or radiation pyrometry. More particularly, it relates to radiation thermometry and an apparatus therefor which can be effectively employed when ordinary radiation thermometry can not be used, for example, when the radiation energy in the vicinity of the material, i.e. the background noises (stray radiation), is equal to or more than the radiation energy of the material and the emissivity of the material changes, that is, in a case such as the temperature measurement of a material having a slightly higher temperature than an ordinary room temperature by radiation or a radiation temperature measurement of such a material as a steel sheet heated in an industrial furnace such as a continuous annealing furnace.

It is desirable to use a radiation thermometer capable of measuring the temperature of a heated material without contact therewith for the measurement of the surface temperature of the heated material moving or resting in an industrial furnace. In fact, a radiation thermometer has been employed for temperature measurement in various fields.

For example, in U.S. Pat. No. 3,969,943 it is disclosed that a cooled shielding plate is employed in order to cut the background noises emitted from the walls of the industrial furnace or the heat sources. However, this Patent does not show any means to deal with a change of the emissivity of the material. Therefore, the application of the method disclosed in the Patent is limited to a small range. That is, the application is limited to a situation in which the emissivity of the material does not change due to the oxidation of the material, for example, temperature measurement of the material in a reducing furnace.

In addition, a publication entitled "Furnace Load Temperature Measurement During Heating Process", Industrial and Process Heating Feb., (1967) by R. Barber discloses a method for measuring the temperature of a material in an industrial furnace by using two radiation thermometers. The feature of disclosure is that one thermometer is positioned near the wall of the furnace to measure the radiation energy, and the other thermometer is positioned near the steel sheet to measure the radiation energy thereof and thereby to calculate the radiation energy of the steel sheet itself. In this case, however, the technique disclosed in the literature can not be applied to the situation in which the emissivity of the steel sheet changes. On the other hand, British Pat. No. 1,298,526 shows a means to correct for a change in emissivity. However, the Patent is not directed to a measurement of the emissivity itself but it is directed to a temperature measurement of the material independently of the change of the emissivity. In addition, the means cannot be used with a radiation thermometer in the presence of a large amount of disturbance in an industrial furnace.

That is, in an industrial furnace the radiation energy emitted from the furnace walls or the heat sources acts the source of a large amount of disturbance energy, i.e. background noises, and the radiation energy reflected by the material to be measured is detected by the radiation thermometer. Therefore, it is impossible to conduct an accurate temperature measurement of the material unless the material is shielded from the disturbance energy. In addition, it is well known that, when the emissivity of the material fluctuates a large error in the temperature measurement generally occurs when measuring by radiation thermometry. Therefore, there are many cases in which improper temperature measurement is carried out due to the above two problems with radiation thermometry. Especially, when the material is a steel sheet such as a thin plate or a plate which is placed in an annealing furnace, the surface of the steel sheet is oxidized during the heating of the same and thereby the emissivity of the steel sheet is changed to a great extent. Thus, a large error occurs in measuring the temperature of the steel sheet by the radiation therefrom so that accurate temperature measurement is substantially impossible. The same situations as the above sometimes occur in the radiation temperature measurement of a metal having a slightly higher temperature than an ordinary room temperature in an atmosphere, or air. That is, in many cases the radiation energy emitted from the surface of the metal itself is equal to or less than the disturbance energy, namely the radiation energy emitted from the vicinity of the metal since the temperature of the metal has only an ordinary temperature or slightly higher than ordinary.

It is therefore an object of this invention to overcome the disadvantages set forth above.

It is another object of this invention to make it possible to always conduct an accurate temperature measurement of the surface of a material by cutting out the radiation energy emitted from such surrounding elements as industrial furnace walls or heat sources and measuring the emissivity of the material simultaneously with the temperature measurement.

According to this invention, there is provided a method for the simultaneous measurement of both the temperature and emissivity of a heated material which comprises the steps of; positioning a black body furnace and a radiation thermometer spaced from each other in the direction of the surface of the heated material in specular symmetry to a line normal to the surface of the heated material, the wavelength band of the detector of the radiation thermometer being preliminarily selected such that the surface of the heated material shows specular reflection characteristics in the band; changing the radiation energy emitted from said black body furnace and detecting the radiation energy before and after the change by the radiation thermometer and simultaneously therewith detecting the temperature of the black body furnace by a means for detecting temperature; determining the emissivity of the heated material by the use of the two detected radiation energies and the temperature of the black body furnace; and then obtaining the surface temperature of the heated material.

According to this invention, there is also provided a method for the simultaneous measurement of both the temperature and emissivity of a heated material which comprises the steps of; positioning first and second black body furnaces and first and second mirrors spaced from each other in the direction of the surface of the heated material with the first black body furnace and the second mirror in specular symmetry to a line normal to the surface of the heated material, and the second black body furnace and the first mirror in specular symmetry to the normal line and with the optical axes of the first and second black body furnaces intersecting at the same point on the heated material; controlling the first and second black body furnaces so that they are at different temperatures from each other; alternatively leading the radiation energy emitted from the first black body furnace and reflected by the second mirror and the radiation energy emitted from the second black body furnace and reflected by the first mirror into the detector of a radiation thermometer to detect the respective radiation energies and simultaneously therewith detecting the temperature of each of the first and second black body furnaces by a means for detecting temperature, the wavelength band of the detector of the radiation thermometer being preliminarily selected such that the surface of the heated material shows specular reflection characteristics in the band; determining the emissivity of the heated material by the use of the radiation energies and the temperatures of the first and second black body furnaces; and then obtaining the temperature of the heated material.

According to a modification of the method of this invention, after the distribution of reflection energy intensity from the heated material relative to the reflection angle is obtained, the wavelength band of the detector is selected such that the extent of the angle in which the reflection energy intensity is 1/10 or more of the peak value of the radiation energy intensity is 5° or less.

According to a modification of the method of this invention, the simultaneous measurement is conducted while the heated material is being moved.

According to a modification of the method of this invention, the simultaneous measurement is carried out while the heated material is at a standstill.

According to a modification of the method of this invention, the heated material is a heated metal, said black body furnace and said radiation thermometer are arranged at an optional angle in a range from 70° to 85° to the normal line, the heated material has a slightly higher temperature than room temperature and the simultaneous measurement is carried out in the atmosphere.

According to a modification of the method of this invention, the temperature of said black body furnace can be controlled.

According to this invention, there is also provided an apparatus for the simultaneous measurement of both the temperature and emissivity of a heated material which comprises; a black body furnace and a radiation thermometer spaced from each other in the directions of the surface of the heated material in specular symmetry to a line normal to the surface of the heated material, the wavelength band of the detector for radiation energy of the radiation thermometer being preliminarily selected such that the surface of the heated material shows specular reflection characteristics in the band; a means for detecting the temperature of said black body furnace; a shielding disc in front of the opening of the black body furnace and movable for interrupting the radiation energy emitted from the opening, the shielding disc having a water-cooling means for keeping the temperature of the disc lower than that of the black body furnace; and an arithmetic unit for calculating the emissivity and the temperature of the heated material from the detected temperature of the black body furnace and the values of radiation energy detected by the radiation thermometer when the opening is covered with the shielding disc and when the opening is exposed to the surface of the heated material.

According to this invention, there is also provided an apparatus for the simultaneous measurement of both the temperatue and emissivity of a heated material which comprises; first and second black body furnaces and first and second mirrors spaced from each other in the direction of the surface of the heated material with the first black body furnace and the second mirror being in specular symmetry to a line normal to the surface of the heated material, the second black body furnace and the first mirror being in specular symmetry to the normal line and the optical axes of the first and second black body furnaces intersecting at the same point on the surface of the heated material; means for detecting the temperature of each of the black body furnaces; means for controlling the temperature of each of the first and second black body furnaces; a radiation thermometer, the wavelength band of the detector of which is preliminarily selected such that the surface of the heated material shows specular reflection characteristics in the band; means for alternatively leading the radiation energy emitted by the first black body furnace and reflected by the second mirror and the radiation energy emitted by the second black body furnace and reflected by the first mirror into the radiation thermometer; and an arithmetic unit for calculating the emissivity and the temperature of the heated material from the radiation energies detected by the detector and the temperatures of the detected first and second black body furnaces.

According to a modification of the apparatus of this invention, the apparatus further comprises a checking means consisting essentially of a thin metal plate having a thermocouple thereon and a driving means for elevating the thin metal plate and lowering the same near to the surface of the heated material in the direction of the normal line.

According to a modification of the apparatus of this invention, said black body furnace is provided with a means for controlling temperature of the black body furnace.

This invention is further described in detail with reference to the accompanying drawings, in which:

FIG. 1 a diagram an experimental apparatus for testing the reflection characteristics of a surface of a steel sheet.

FIG. 7 is a diagram of another preferred embodiment of an apparatus of this invention.

Figure 1:
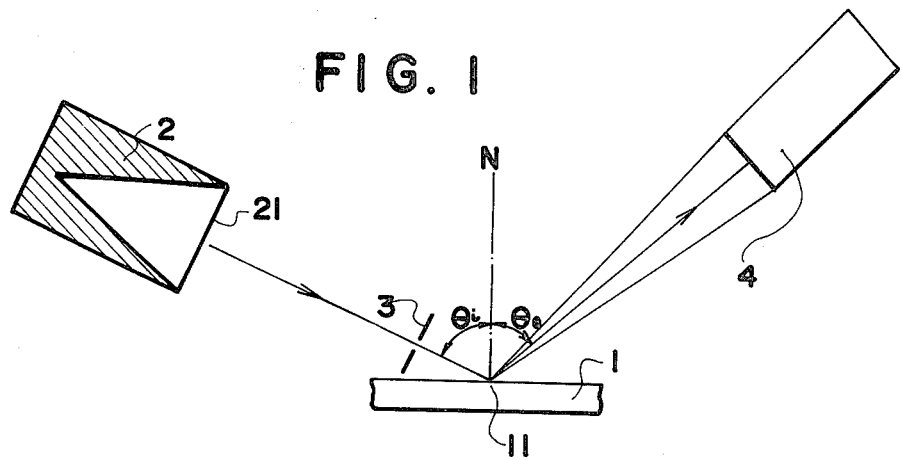
Figure 2:
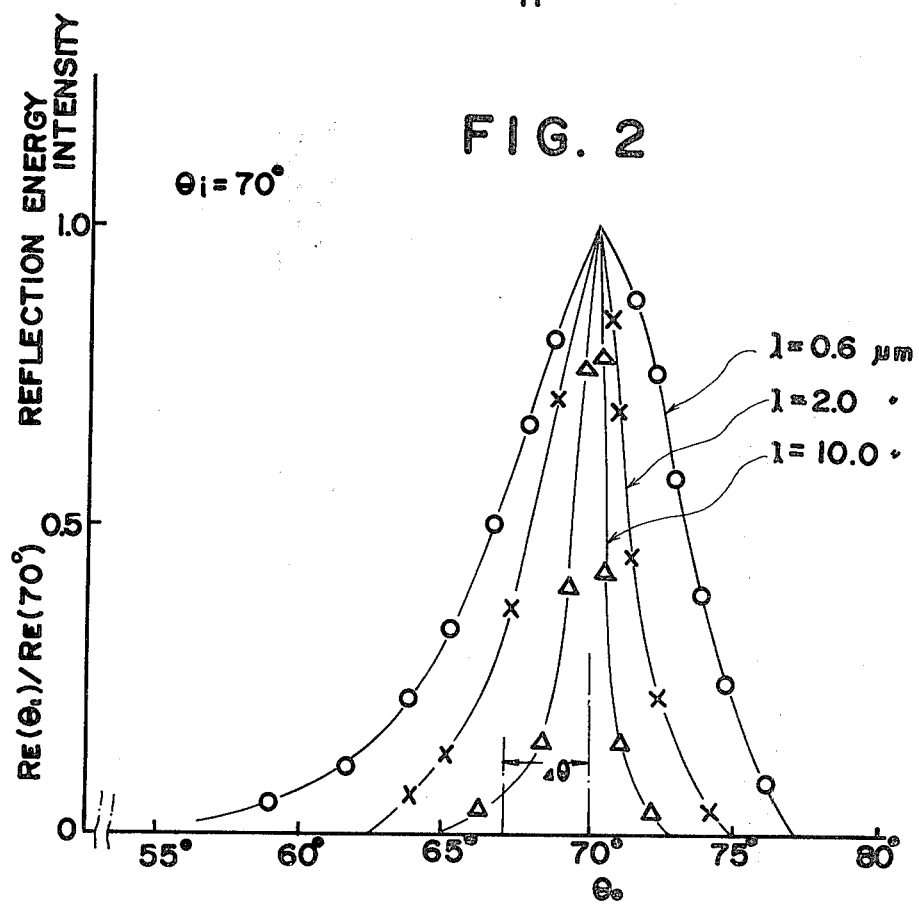
FIG. 2 is a graph of the results of the test of FIG. 1.

FIGS. 1 and 2 show one example of an experiment for determining the reflection, or mirror-like, characteristics of the surface of a steel sheet. FIG. 1 shows an apparatus for the experiment. In FIG. 1, 1 is a steel sheet the characteristics of which are to be measured, 2 is a black body furnace and 3 is a slit, through which the radiation energy emitted from the opening 21 of the black body furnace 2 is irradiated on the surface 11 of the steel sheet 1 at the angle $\theta i$ to the line N normal to the surface 11. A radiation thermometer, or a radiation pyrometer, 4 is arranged in the plane formed by the furnace 2 and the normal line N and at an angle $\theta o$ to the normal line N. The angle $\theta o$ is changed gradually while the radiation energy emitted from the black body furnace 2 is kept constant, i.e. the temperature of the furnace 2 is kept constant, and the reflection energy $R_E(\theta o)$ detected by the radiation thermometer 4 is divided by the reflection energy $R_E(70°)$ when $\theta o = \theta i = 70°$ and is normalized. The reflection energy intensity distribution relative to the reflection angle thus obtained is shown in FIG. 2.

In FIG. 2 the steel sheet employed for test was a cold rolled steel sheet and $\lambda$ is the wavelength of an electromagnetic wave to be detected. It is noted from FIG. 2 that the reflection characteristics become the more specular, or mirror-like, the longer the wavelength becomes. The shape of the curve showing the reflection characteristics is, of course, depending upon the change kinds of metal sheet employed.

It is possible to effectively reduce the disturbance due to the radiation energy emitted from the surrounding environment, namely the walls of the industrial furnace or the heat sources, which is the first problem to be solved, in measuring the temperature of a material heated in an industrial furnace of a metal having a temperature slightly higher than room temperature in the atmosphere by radiation thermometry utilizing the specular, or mirror-like, reflection characteristics of the material or the metal. That is, the radiation thermometer 4 is arranged at an angle $\theta$ to the line N normal to the surface of the steel sheet 1 to be measured and the black body furnace 2 is arranged in the plane containing the normal line N and the line along which radiation is directed into the radiation thermometer 4 and in the direction of specular symmetry to the thermometer 4 relative to the normal line N. In addition, the wavelength band, or range, of the detector of the radiation thermometer 4 is selected such that the steel sheet 1 has good specular, or mirror-like, reflection characteristics in the band. When the apparatus is thus constituted, the reflection energy incident upon the radiation thermometer 4 becomes only the amount of the radiation energy which is radiated by the black body furnace 2 and is reflected by the steel sheet 1 plus the amount of the radiation energy radiated by the steel sheet 1 itself, and the radiation energy emitted from the surrounding environment i.e. the industrial furnace wall or the heat sources, etc., is eliminated due to the specular, or mirror-like, reflection characteristics 2. Thus, the radiation thermometer 4 is completely shielded from disturbance, or the radiation energy emitted from the surrounding environment.

All the radiation energy emitted from the black body furnace 2 is not incident upon the radiation thermometer 4 but that only the component specularly reflected by the surface 11 of the steel sheet 1 is incident upon the same. When the steel sheet has specular, or mirror-like, reflection characteristics at a certain wavelength, if the emissivity in the direction of the angle $\theta$ to the line N normal to the surface of the steel sheet 1 is defined as $\epsilon\theta$, the reflectivity $\gamma\theta$ in the direction of the same angle has a property according the following equation.

$$\gamma\theta = 1 - \epsilon\theta \tag{1}$$

By utilizing this property the second problem can be overcome. That is, even if the emissivity of the steel sheet is changed during the course of the measurement, the emissivity can be measured simultaneously with the temperature of the steel sheet 1 and the surface temperature of the steel sheet can accurately be measured by correcting the measured temperature by the emissivity. Thus, the two great problems in the radiation temperature measurement of the heated material in an industrial furnace or of a metal having a temperature slightly higher than room temperature in atmosphere can completely be overcome.

A preferred embodiment of this invention is described below.

Figure 3:
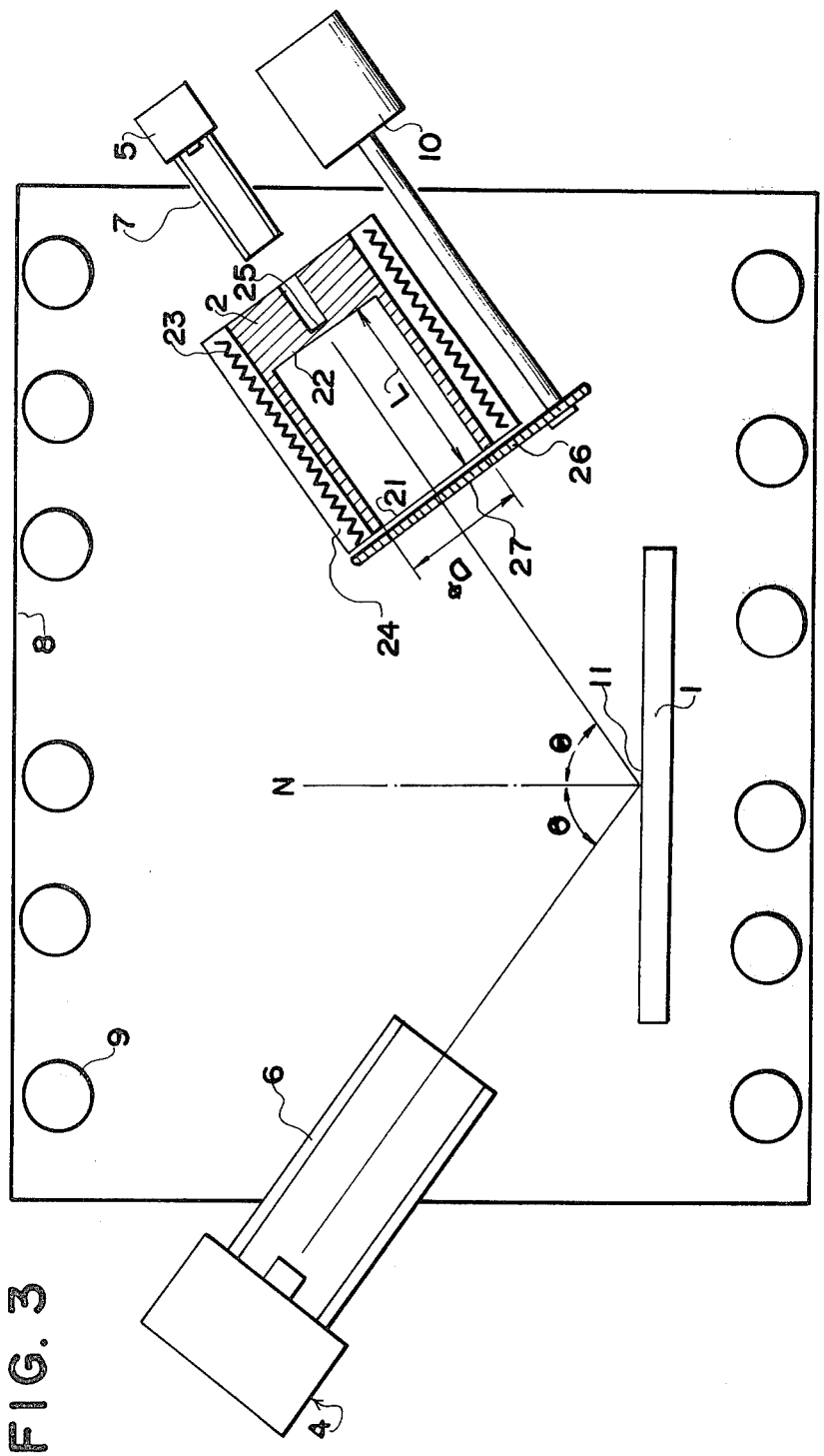
FIG. 3 is a diagram, partly in section of one preferred embodiment of an apparatus according to invention.

FIG. 3 shows one example of an apparatus for radiation temperature measurement of a heated material in an industrial furnace. In this embodiment the black body furnace 2 is cylindrial type and it is desirable that the black body furnace 2 be made of black lead or alumina in view of the fact that the black body furnace 2 may be placed in the industrial furnace. When the diameter of the opening 21 of the cylindrical cavity of the black body furnace 2 and the length from the opening 21 to the bottom surface 22 of the black body furnace 2 are defined as D and L, respectively, and the black body furnace 2 is made such that it satisfies the condition $L/D \geq 2$, it can function satisfactorily as a black body furnace. That is, such a black body furnace 2 has an emissivity $\epsilon a$ of 0.98 or more. In this embodiment the black body furnace 2 is provided with a means for controlling the temperature of the inner wall thereof, for example a heater 23, in order to keep the temperature of the inner wall constant. The black body furnace 2 absorbs the whole radiation energy incident upon the opening 21 thereof from the industrial furnace walls 8 and/or the heat sources 9 with a sufficiently practical accuracy and it radiates the radiation energy of the black body furnace Eb(T) equivalent to the temperature of the inner wall T of the black body furnace. A heat insulating material 24 covers the black furnace 2 and 24 is a heat insulating material covering the black body furnace 2. The temperature of the inner wall of the cylindrical cavity of the black body furnace 2 can be controlled to a proper constant value by measuring the temperature of the back 25 of the bottom surface 22 by the use of another radiation thermometer 5. That is, the radiation thermometer 5 is directed toward the back 25 and the radiation energy of the black body furnace 2 is detected by the radiation thermometer 5. The current flowing through the heater 23 is controlled depending upon the value of the radiation energy thus detected whereby the temperature of the inner wall T of the black body furnace 2 can be properly controlled. The two radiation thermometers 4 and 5 may be provided outside of the industrial furnace to simplify their maintenance. The view angles of the thermometers 4 and 5 should be kept proper by controlling the direction in which the cylindrical cavities 6 and 7 face. A shielding disc 26 is provided in front of the opening 21 of the black body furnace 2. The shielding disc 26 is kept at a sufficiently low temperature, as compared with that of the steel sheet 1, and it is driven so that it can intermittently cover the opening 21 by a driving means such as a motor 10 provided outside of the industrial furnace. In order to kept the temperature of the disc 26 low, for example, the disc 26 is provided with a water cooling means, or mechanism, and the surfaces 27 thereof are coated with a black paint. In FIG. 3, the wall of the industrial furnace and a heat source are designated by reference numbers 8 and 9, respectively.

The wavelength band, or region, to be used for the detector of the radiation thermometer 4 must be selected such that the surface of the steel sheet has a sufficiently specular, or mirror-like, reflection characteristics for the radiation energy to be detected, which is one of the important points in this invention.

The specular, or mirror-like, reflection characteristics are changed depending upon the wavelength $\lambda$ being detected as shown in FIG. 2, and the curves in FIG. 2 are themselves also changed in accordance with the kinds of material being measured. The specular reflection characteristic, namely the sharpness of the peak of the characteristic curves in FIG. 2, shows the degree of the error in measurement. Therefore, the degree of the error can be kept in an allowable range. Particularly, the range of the wavelength $\lambda$ is selected such that the extent of the angle $\Delta\theta$ in which the reflection energy is more than 1/10 of the peak value of the radiation energy intensity is 5° or less as shown in FIG. 2 and, when the radiation energy within the range, or band, of the wavelength $\lambda$ is to be detected, the error in measurement becomes small, namely 1% or less. In such a case, the diameter D of the opening 21 of the black body furnace 2 can be about ten times as large as the diameter Do of the opening required in when the material to be measured has a completely specular, mirror-like, reflection surface. The reason is as follows:

A distance coefficient F is in general defined in a radiation thermometer and when the whole area having the diameter Do mm$\phi$ is measured from the spot of the distance L mm therefrom by the radiation thermometer, the relation among the F, Do and L is represented by the following equation.

$$F \cdot Do = L$$

That is, when a radiation thermometer having a distance coefficient F=100 is placed at a spot L=1000 mm, Do becomes 10 mm$\phi$. In such a case, a D capable of covering an angle $\Delta\theta=5°$ is about 100 mm$\phi$, which is ten times as large as Do or so. Thus, it is also reasonable that the diameter D of the opening be 100 mm$\phi$ for practical reasons.

The selection of the wavelength of the detector in the radiation thermometer 4 is conducted as follows.

The reflection characteristics of each of the materials to be measured, i.e. samples, are preliminarily examined in a laboratory and the wave lengths to be used for detection are changed in order, as shown in FIG. 2, and the wavelength band to be employed can be selected from the results of the examination, i.e. radiation energy intensity distribution. For example, when the material to be measured is a cold rolled steel sheet or a silicon steel, a sufficiently practical specular, or mirror-like, reflection characteristics can be obtained by using a long wavelength $\lambda$ of 2 $\mu$m or more. In case of a stainless steel sheet and a zinc-plated steel sheet adequate specular reflection characteristics can be obtained when the wavelength $\lambda$ is 1 $\mu$m or more. In the same manner as the above, in case of a hot rolled steel sheet and a thick steel plate, the respective wavelengthes have been determined to be 3 $\mu$m or more and 8 $\mu$m or more.

For the purpose of limiting the wavelength of the detector to the above values the radiation thermometer in which a sensitivity of the detector peaks at the desirable wavelength may be employed or a narrow band filter may be provided for the radiation thermometer having a sensitivity over a broad wavelength band. In this connection, the wavelength band of the radiation thermometer 5 for controlling the temperature of the black body furnace 2 may be selected optionally.

The principle s used for measuring temperature and emissivity according to this invention are described below.

The temperature of the water-cooled shielding disc 26 is kept sufficiently low, as compared with the temperature $T_1$ of the steel sheet 1 and, when the thus cooled shielding disc 26 covers the opening 21 of the black body furnace 2, the radiation energy $E_1$ which is detected by the radiation thermometer 4 is represented by the following equation.

$$E_1 = \epsilon\theta \cdot Eb(T_1) \qquad (2)$$

In the equation (2) the $\epsilon\theta$ is the term emissivity of the steel sheet 1 and it is the value for the angle $\theta$, as shown in FIG. 3. Next, the temperature of the black body furnace is defined as $T_2$ and, when the shielding disc 26 is removed from in front of the opening 21 by rotation, the radiation energy $E_2$ detected by the radiation thermometer 4 is represented by the following equation.

$$E_2 = \epsilon\theta \cdot Eb(T_1) + (1 - \epsilon\theta) \cdot Eb(T_2) \qquad (3)$$

In the equation (3) the $\epsilon\theta \cdot Eb(T_1)$ is the term radiation energy from the steel sheet itself, and the $(1-\epsilon\theta) \cdot Eb(T_2)$ is the energy emitted from the black body furnace 2 and reflected by the steel sheet 1.

In the wavelength band wherein the steel sheet 1 has sufficiently specular reflection characteristics in the band, the reflectivity $\epsilon\theta$ is shown by the equation (1), as mentioned above. Therefore, the equation (3) is true. In the equations (2) and (3) the term $Eb(T_2)$ is the radiation energy of the black body furnace 2 at the time when the temperature of the black body furnace 2 is $T_2$, and it can be directly detected by the radiation thermometer 4. In addition, the term $Eb(T_2)$ for the radiation thermometer 4 equivalent to the temperature $T_2$ can instantly be obtained since the temperature $T_2$ can be directly measured by the radiation thermometer 5 for controlling temperature. Therefore, the equations (2) and (3) are simultaneous equations including two unknown quantities, i.e. $\epsilon\theta$ and $T_1$, and the emissivity $\epsilon\theta$ and the temperature $T_1$ of the steel sheet 1 can be simultaneously obtained by solving the simultaneous equations. That is, when the $\epsilon\theta \cdot Eb(T_1)$ of the equation (3) is replaced by the equation (2) and equation (3) is rearranged, the term $\epsilon\theta$ can be expressed by the following equation.

$$\epsilon\theta = 1 - \frac{E_2 - E_1}{Eb(T_2)} \quad (4)$$

In addition, the equation (2) can be changed as follows:

$$Eb(T_1) = \frac{E_1}{\epsilon\theta} \quad (5)$$

The $Eb(T_1)$ can be obtained by using the $\epsilon\theta$ obtained by the above equation (4). The term $Eb(T_1)$ is the value of radiation energy of the black body furnace 2 at the temperature $T_1$ and, therefore, the surface temperature $T_1$ of the steel sheet 1 can be obtained, for example, by using the following Wien's equation.

$$Eb(T_1) = C_1 \cdot \lambda^{-5} \exp(-\frac{C_2}{\lambda T_1}) \quad (6)$$

In the equation (6) the terms $C_1$ and $C_2$ are constants, respectively.

Figure 4:
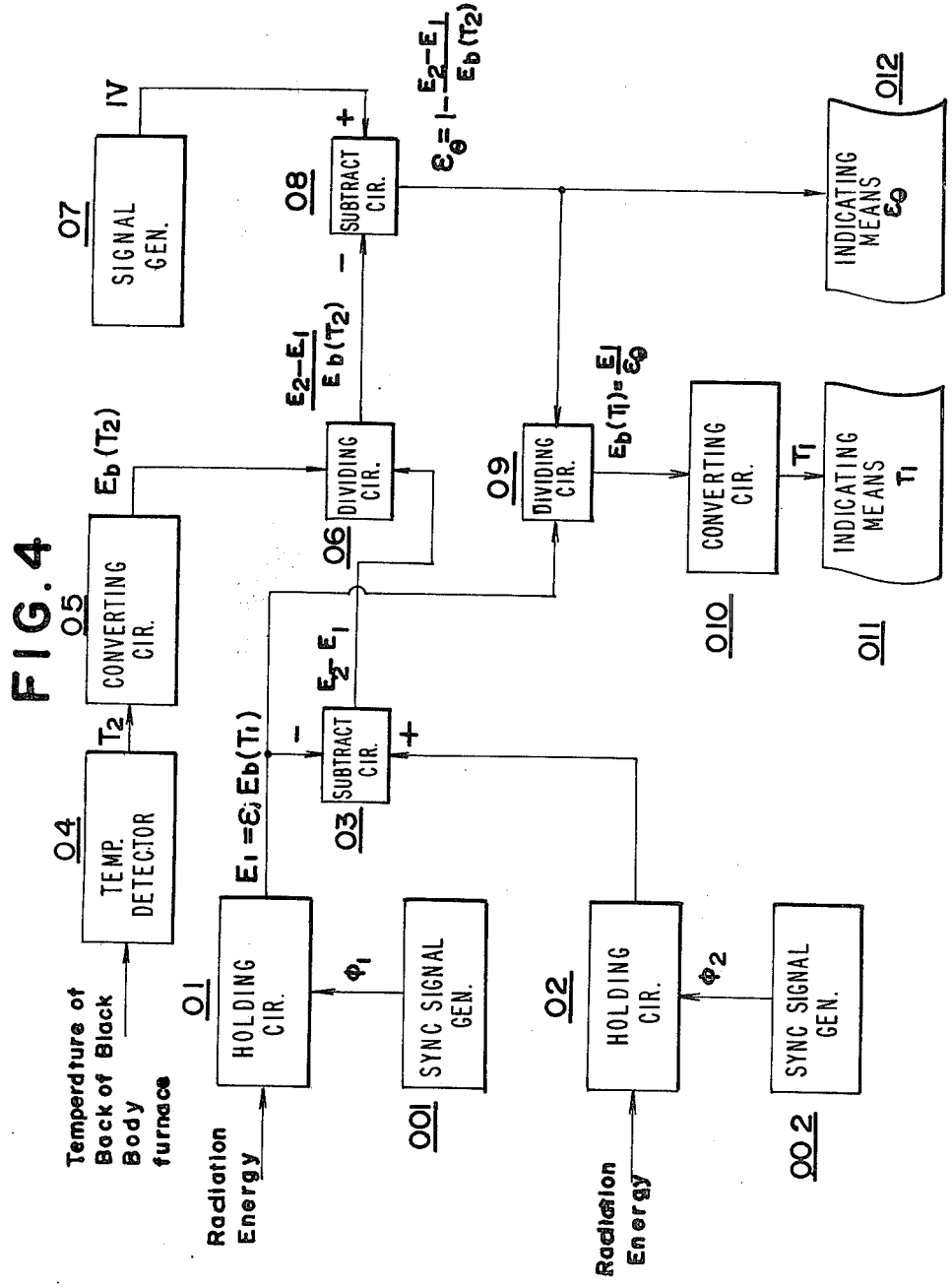
FIG. 4 is an diagram of a arithmetic unit for calculating the emissivity and temperature of a steel sheet.

FIG. 4 is a diagram of an arithmetic unit for calculating the emissivity and temperature of the steel sheet.

In FIG. 4 001 is a first circuit for generating a synchronous signal $\phi_1$ at the time when the opening 21 of the black body furnace 2 is covered with the shielding disc 26 and 002 is a second circuit for generating a synchronous signal $\phi_2$ at the time when the opening is exposed to the surface 11 of the steel sheet. The energy detected by the radiation thermometer 4 is held in a first holding circuit 01 in response to the synchronous signal $\phi_1$ of the first circuit 001 or in a second holding circuit 02 in response to the synchronous signal $\phi_2$ of the second circuit 002. The first and second holding circuits 01 and 02 generate output voltages $E_1$ and $E_2$ equivalent to the detected energies received by the first and second holding circuits 01 and 02, respectively. The output voltages $E_1$ and $E_2$ are introduced into a first subtracting circuit 03, from which the subtraction signal $E_2-E_1$ is generated as an output. On the other hand, the temperature $T_2$ of the black body furnace 2 is detected by a detecting means, or detector, 04 of the radiation thermometer 5 and the detected value $T_2$ is converted to the radiation $Eb(T_2)$ of the radiation thermometer 4, namely the radiation energy $EB(T_2)$ of the black body furnace 2 at the temperature $T_2$, in a first converting circuit 05. The output signals $E_2-E_1$ and $Eb(T_2)$ of the first subtracting circuit 03 and the first converting circuit 05 are introduced into a first dividing circuit 06, from which a divided signal $(E_2-E_1)/Eb(T_2)$ is generated as an output signal. 07 is a circuit for generating a standard signal of IV as an output. The output signals of the first dividing circuit 06 and the circuit 07 are introduced into a second subtracting circuit 08 in which the emissivity $\epsilon = 1 - E_2 - E_1/Eb(T_2)$ is obtained. In addition, the output signals of the second subtracting circuit 08 and the first holding circuit 01 are introduced into a second dividing circuit 09, from which a divided signal $Eb(T_1) = E_1/\epsilon$ is generated as an output signal. The temperature $T_1$ is obtained from the output signal $Eb(T_1) = E_1/\epsilon$ in second converting circuit 010. The temperature $T_1$ and emissivity $\epsilon\theta$ thus obtained are indicated by a first indicating means 011 and a second indicating means 012, respectively.

Because of the provision of the detecting means 04 and the first converting circuit 05, it is unnecessary to keep the temperature $T_2$ of the black body furnace 2 exactly constant. That is, if the value $Eb(T_2)$ is always obtained by the detecting means 04 and the first converting circuit 05, the temperature $T_2$ may be changed during the measurement. Therefore, it is necessary to detect the temperature $T_2$ with accuracy but it is unnecessary to keep it constant.

As set forth above, the feature of this invention is that a black body furnace and a radiation thermometer are arranged at such an angle that they are in specular, or mirror-like, symmetry to a line normal to a steel sheet surface and the wavelength band of the detector of the radiation thermometer is selected such that only the radiation energy emitted from the black body furnace and reflected by the steel sheet is incident upon the radiation thermometer so that radiation thermometer detects only the radiation energy emitted from the steel sheet itself and not the disturbance energy emitted from the walls of an industrial furnace and heat sources, etc. Such a selection of wavelength band and such an arrangement make it possible not only to eliminate the disturbance energy but also to always measure the emissivity of the steel sheet precisely, even if the emissivity is changed during the measurement. Therefore, according to this invention the temperature of the steel sheet can be measured accurately.

Figure 5:
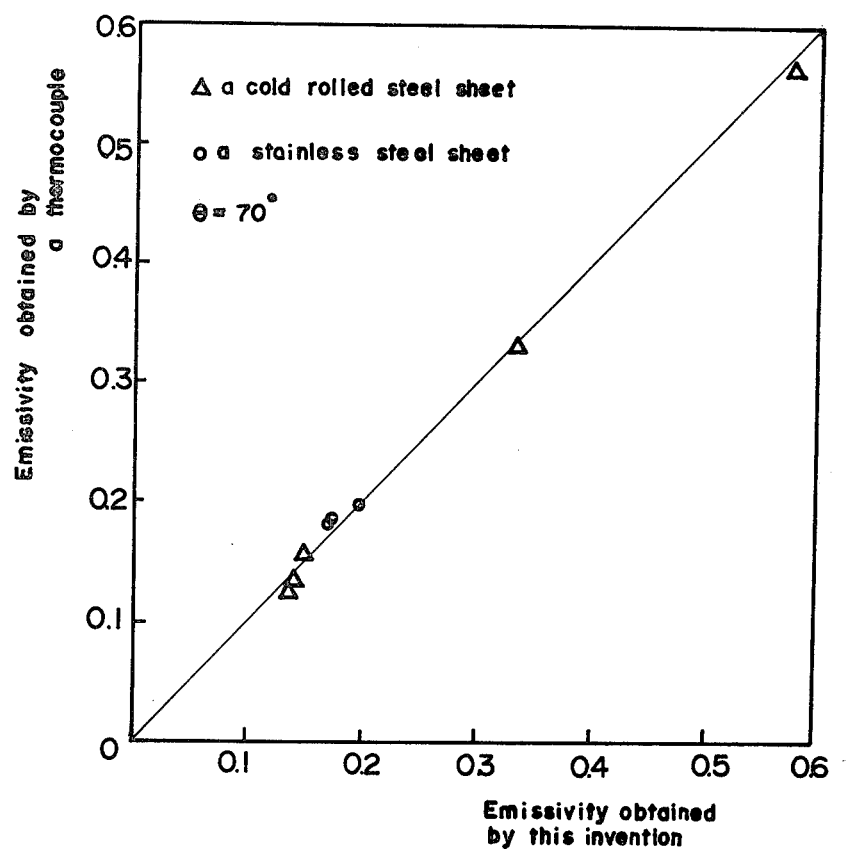
FIG. 5 is a graph showing the relation between the emissivity measured by this invention and that measured by using a thermocouple.
Figure 6:
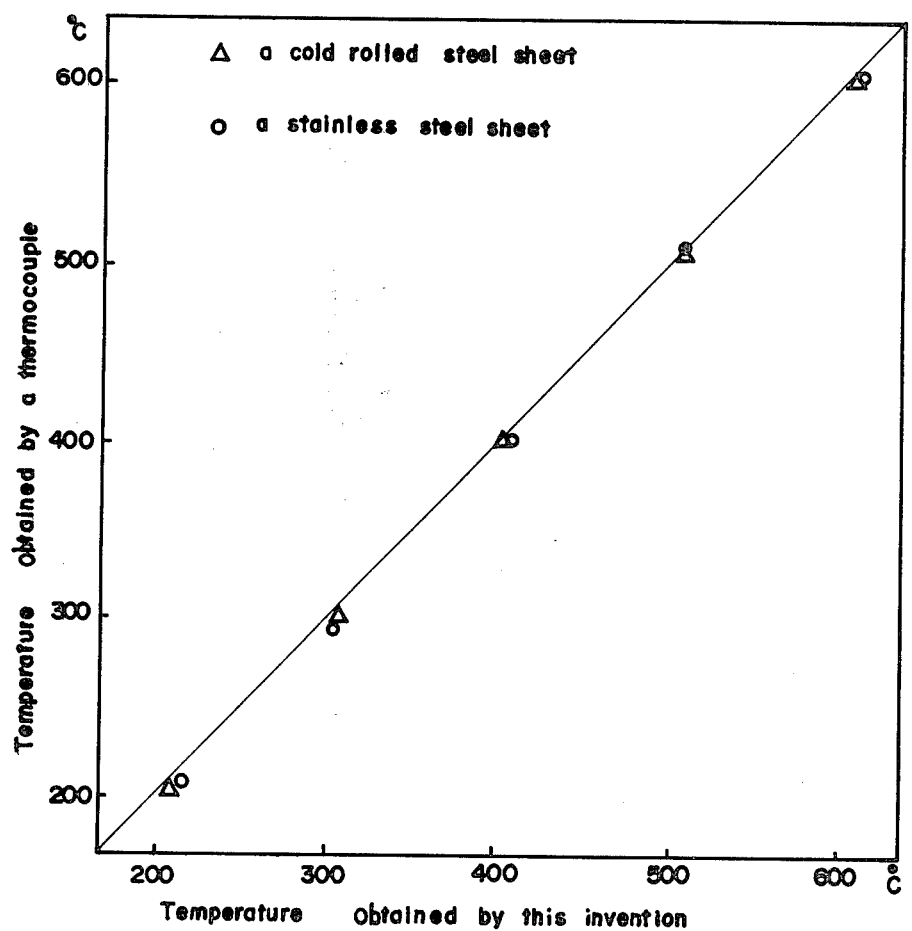
FIG. 6 is a graph showing the relation between the temperature measured by this invention and that measured by using the thermocouple.

FIGS. 5 and 6 are graphs made from experimental data for showing the effects of this invention.

FIG. 5 is a graph in which the emissivities of samples are plotted by comparing the emissivities obtained by this invention (abscissa) with those obtained by a thermocouple point-welded on the samples (ordinate). The experiment was conducted outside of an industrial furnace and the measurement was carried out while the samples were heated from 200° C. to 600° C. When using the thermocouple, the emissivities were obtained by measuring the temperatures of the samples by the thermocouple and then comparing the radiation energy of the black body furnace equivalent to the temperatures with the detection energy detected by the radiation thermometer. As noted from FIG. 5, the emissivities obtained by this invention substantially correspond to those obtained by the thermocouple, which proves that this invention operates as described. In this connection, the trangular marks and the circular marks designate the emissivities of a cold rolled steel sheet and a stainless steel sheet, respectively. The angle $\theta$ at which the radiation thermometer and the black body furnace were positioned in the specular, or mirror-like, symmetry to the normal line to the samples was 70° and the band of the wavelength $\lambda$ of the detector in the radiation thermometer was 5 $\mu$m or so.

Figure 8:
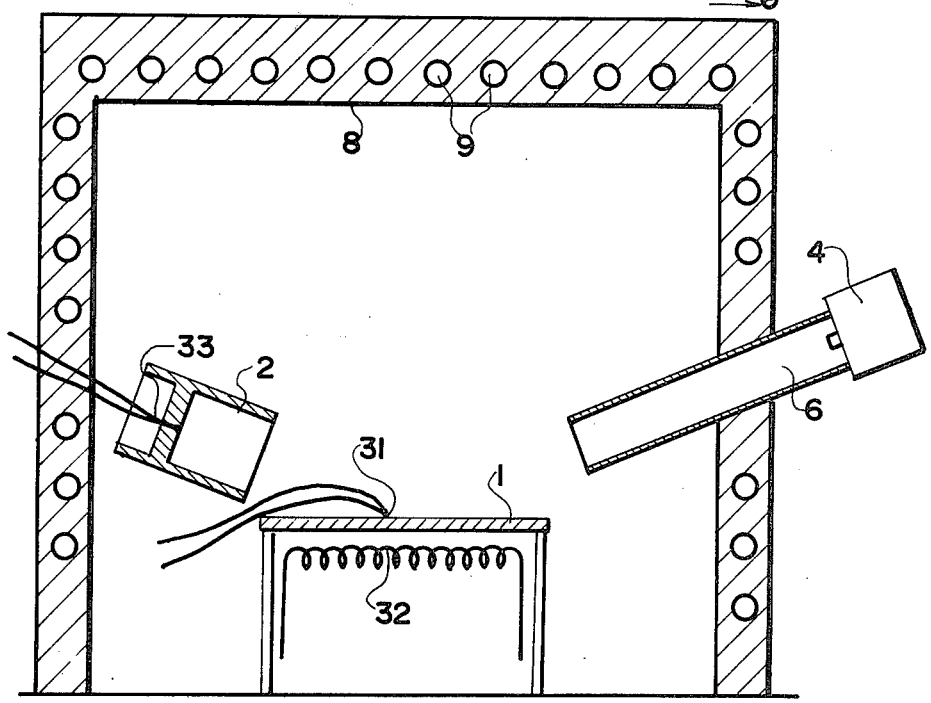
FIG. 8 is a sectional view of the apparatus used to obtain the experimental results of FIGS. 5 and 6.

FIG. 6 is a graph in which the temperatures of samples are plotted comparing the temperatures obtained by this invention (abscissa) with those obtained by a thermocouple point-welded on the samples (ordinate). The experiment was conducted in an industrial furnace, the wall of which was heated to 700° C., and the measurement of the temperatures was carried out while the samples were heated from 200° C. to 600° C., as shown in FIG. 8 wherein 31 is a thermocouple and 32 is a heater, 33 being a thermocouple used instead of the radiation thermometer 5 shown in FIG. 3. FIG. 6 shows that this invention makes it possible to measure the temperature of the samples precisely.

In the above embodiment a black body furnace of a cylindrical type having a bottom surface has been employed but, of course, a black body furnace of any other type may be employed. For example, a black body furnace of a hemispherical type, a conical type or a rectangular type can be used. In addition, a disc or the like may be employed as a black body furnace if the emissivity of the surface thereof sufficiently approaches a black body, namely 1.0. In fact, the emissivity of the water-cooled shielding disc 26 coated with a black paint is about 0.95. A radiation thermometer 5 has been employed for controlling the temperature of the inner wall of the cylindrical body of the black body furnace 2 and monitoring but the other means can be substituted in the black body furnace. For example, a thermocouple may be employed, as shown in FIG. 8. In this invention two different temperatures of the black body furnace are required in order to measure the emissivity of the material, for which purpose the apparatus of this embodiment has been provided with the water-cooled shielding disc which intermittently covers the front of the opening 21 of the black body furnace controlled to beat a constant temperature. Of course, however, the other arrangements may be employed in this invention. For example, two black body furnaces can be arranged such that the axes thereof intersect at one point of the steel sheet, and they are controlled to be at different temperatures from each other and the radiation energies of the respective furnaces are alternately introduced into a radiation thermometer.

Such an arrangement is shown in FIG. 7, for example, in which a first black body furnace and a second black body furnace, 15 are provided. The first and second black body furnaces 14 and 15 are controlled to be at different temperatures $T_2$ and $T_3$ by a means for controlling temperature such as a heater (not shown). A first mirror 16 and a second mirror 17 are provided, respectively. The first and second black body furnaces 14 and 15 are arranged such that the first black body furnace 14 and the second mirror 17 are in specular, or mirror-like, symmetry to a line normal to the surface of a steel sheet 1 to be measured and the second black body furnace 15 and the first mirror 16 also are in specular or mirror-like, symmetry to the normal line and the optical axes of the first and second black body furnaces 14 and 15 intersect at the same point on the surface of the steel sheet 1. A rotatable mirror 18 which can be rotated by a driving means such as a motor (not shown) and a radiation thermometer 19 are arranged such that the radiation energy emitted by the first black body furnace 14 and reflected by the second mirror 17 and the radiation energy emitted by the second black body furnace 15 and reflected by the first mirror 16 are alternately reflected by the rotatable mirror 18 into the radiation thermometer 19 whereby two different radiation energies $E_2$ and $E_3$ are alternately detected by the detector of the radiation thermometer 19.

In this connection, the difference in temperature between the first and second black body furnaces 14 and 15 may be 100° C. or so for the practice of this invention.

In addition, one black body furnace may be employed to obtain two different temperatures. That is, the two different temperatures can periodically be obtained by changing the temperature of the black body furnace by the use of such a temperature control means as a heater and then the emissivity and temperature of the steel sheet can be obtained by detecting the radiation energy equivalent to each of these temperatures by the radiation thermometer.

In these cases, of course, the detected value represented by the equation (3) will generally be obtained instead of that represented by the equation (2). That is, if at the time when the temperature of the black body furnace is $T_3$ the value detected by the radiation thermometer 4 is represented by $E_3$, $E_3$ is represented by the following equation.

$$E_3 = \epsilon\theta \cdot Eb(T_1) + (1-\epsilon\theta) \cdot Eb(T_3) \tag{7}$$

Therefore, the following equation can be obtained from the equations (3) and (7)

$$\epsilon\theta = 1 - \frac{E_3 - E_2}{Eb(T_3) - Eb(T_2)} \tag{8}$$

The emissivity $\epsilon\theta$ can be obtained by the above equation (8). Furthermore, the equation (3) can be changed as follows:

$$Eb(T_1) = \frac{E_2}{\epsilon\theta} - \frac{1-\epsilon\theta}{\epsilon\theta} Eb(T_2) \tag{9}$$

The value $\epsilon\theta$ obtained by the equation (8) is substituted into the equation (9) whereby the temperature $T_1$ of the steel sheet can be obtained in the same manner as in equation (5).

The angle $\theta$ at which the black body furnace 2 and the radiation thermometer 4 are arranged in specular, or mirror-like, symmetry to the line N normal to the surface of the steel sheet may optionally be selected in general. However, the angle $\theta$ should be made as large as practically allowable because the larger the angle $\theta$ the better the specular reflection characteristics. In addition, the larger the size of the opening of the black body furnace, the more preferable it is, but it depends upon the specular reflection characteristics of the material to be measured. That is, the smaller the size of the opening, the more the material has specular reflection characteristics. Therefore, the size of the opening may be determined after the reflection characteristics are examined during production of a black body furnace.

Preferably the invention is used for measuring the properties of a steel sheet, but this invention can be used for any opaque material. In addition, the black body furnace 2 is preferably provided with means for controlling the temperature of the inner wall thereof such as a heater. It is, however, unnecessary to provide the black body furnace 2 with such a means, that is, it is unnecessary to control the temperature of the black body furnace 2, if the temperature of the black body furnace 2 itself it constantly monitored by a means such as a thermocouple or a black body furnace and the equation (3) is prepared by utilizing one temperature $T_2$ from among the temperatures monitored and the radiation energy $E_2$ at the temperature $T_2$ is detected by the radiation thermometer 4.

This invention has hereinbefore been described in connection with radiation thermometry of a steel sheet placed in an industrial furnace but this invention can also be applied to the radiation thermometry of a metal having a temperature slightly higher than room temperature in the atmosphere. A metal at such a temperature generally has a low emissivity and, therefore, the background noises emitted from the environment surrounding metal is much larger than the radiation energy emitted from the metal itself. In addition, the detection sensitivity is very low since the temperature of the metal is only slightly higher than ordinary room temperature and, therefore, the temperature measurement of metal in such conditions is much more difficult than that of a heated material in an industrial furnace.

Figure 9:
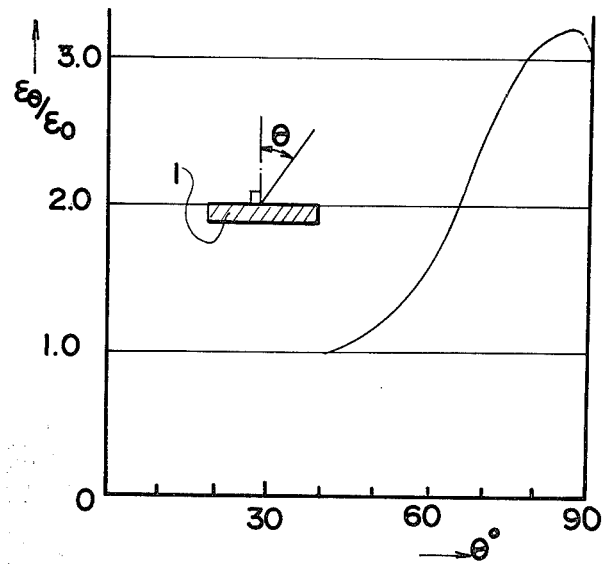
FIG. 9 is a graph showing the relationship of the emissivity of a cold rolled steel sheet to the angle of reflection of the radiation.

In order to overcome these problems the angle dependency of the emissivity of the metal, i.e. the change of emissivity relative to the angle to the surface of the metal, must be positively utilized. In FIG. 9 the angle dependency of the emissivity of a cold rolled steel sheet is shown. FIG. 9 is a graph of the values $\epsilon\theta/\epsilon 0$ obtained at different angle $\theta$ to a line normal to the surface of a cold rolled steel sheet, in which $\epsilon 0$ is the emissivity in the direction of the normal line and $\epsilon\theta$ is the emissivity in the direction of the angle $\theta$ to the normal line. As is clearly seen from FIG. 9, when the angle $\theta$ is 70° to 85°, the emissivity $\theta$ becomes twice the emissivity $\epsilon$ or more. Consequently, in this invention when the angle $\theta$ is made 70° to 85° the detection sensitivity for temperature measurement by the radiation is increased whereby the temperature measurement can be carried out with the same accuracy as radiation temperature measurement of a heated material in an industrial furnace. For example, according to this invention when using a wavelength of 10 $\mu$m the emissivity $\epsilon$ of a cold rolled steel sheet in the direction of the normal line is 0.07 but the emissivity $\epsilon\theta$ at the angle $\theta = 82°$ is 0.22. Thus, it will be understood that the angle dependency greatly influences the detection sensitivity.

When this invention is used with an on-line control system in an apparatus such as a continuous annealing furnace, it is preferable to check whether or not the measuring apparatus of this invention is operating properly. The method of checking the measured temperature by using a thermocouple point-welded on the material to be measured has been widely used as a checking means. Only one point of the material can be measured in the method, which is not very effective although much labor and time are required therefor. In addition, when the method is conducted in a long industrial furnace such as an annealing furnace, much compensating lead wire is required for the thermocouple, which is not very practical.

Figure 10:
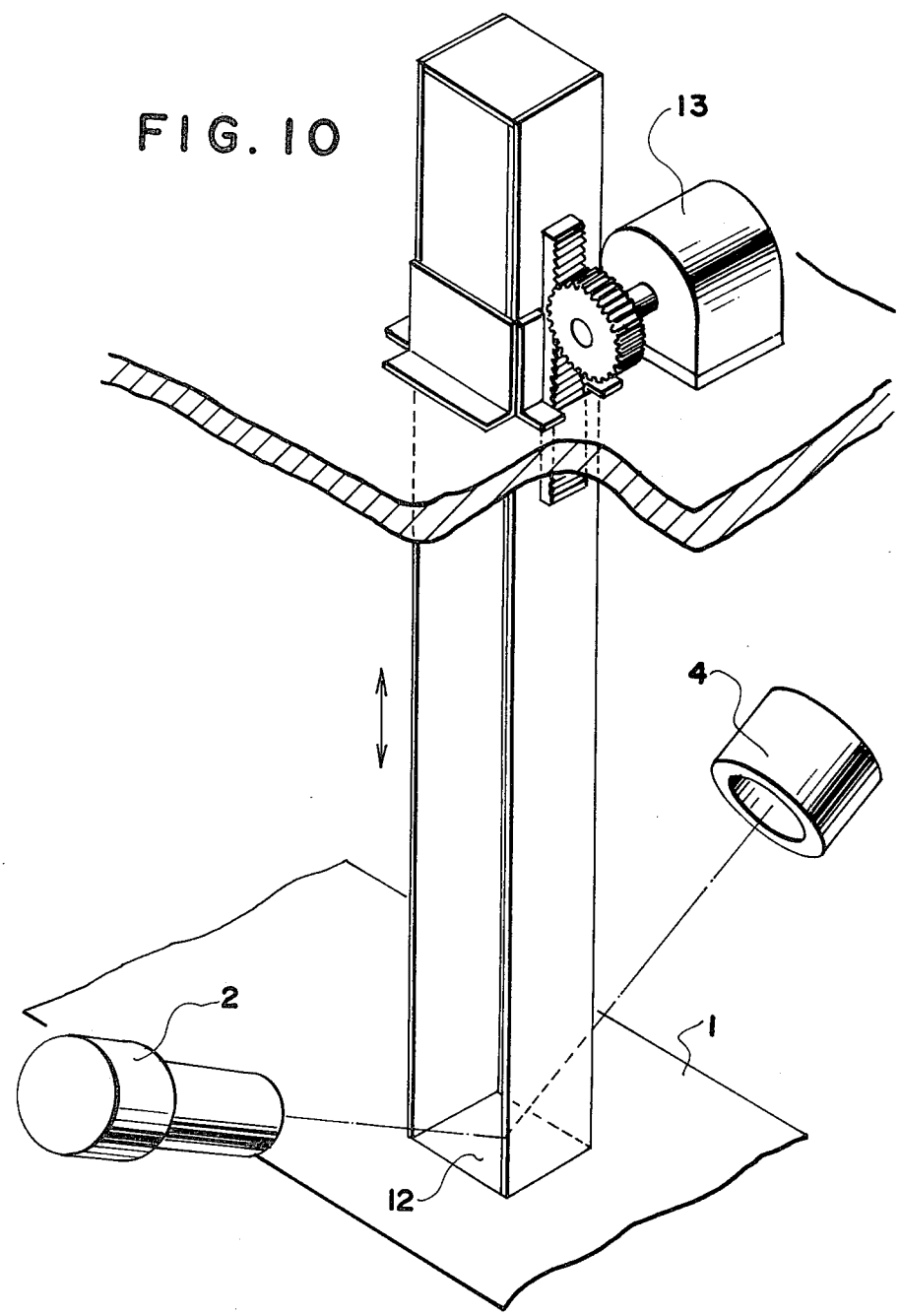
FIG. 10 is a diagrammmatic perspective view of another embodiment of the apparatus of this invention having a means for correcting, or checking, the measured values.

This invention can also overcome these problems. That is, as shown in FIG. 10 in this invention the black body furnace 2 and the radiation thermometer 4 are arranged such that they are in specular, mirror-like, symmetry to a line the normal to the surface of the material and a checking means consisting essentially of a very thin metal sheet 12 and a driving means 13 for elevating and lowering the same to bring it in contact with the material to be measured in the direction of the normal line is provided above the material. The thin metal sheet 12 may be elevated and lowered by the driving means, for example a motor, via a rack and pinion mechanism or the like.

Figure 11:
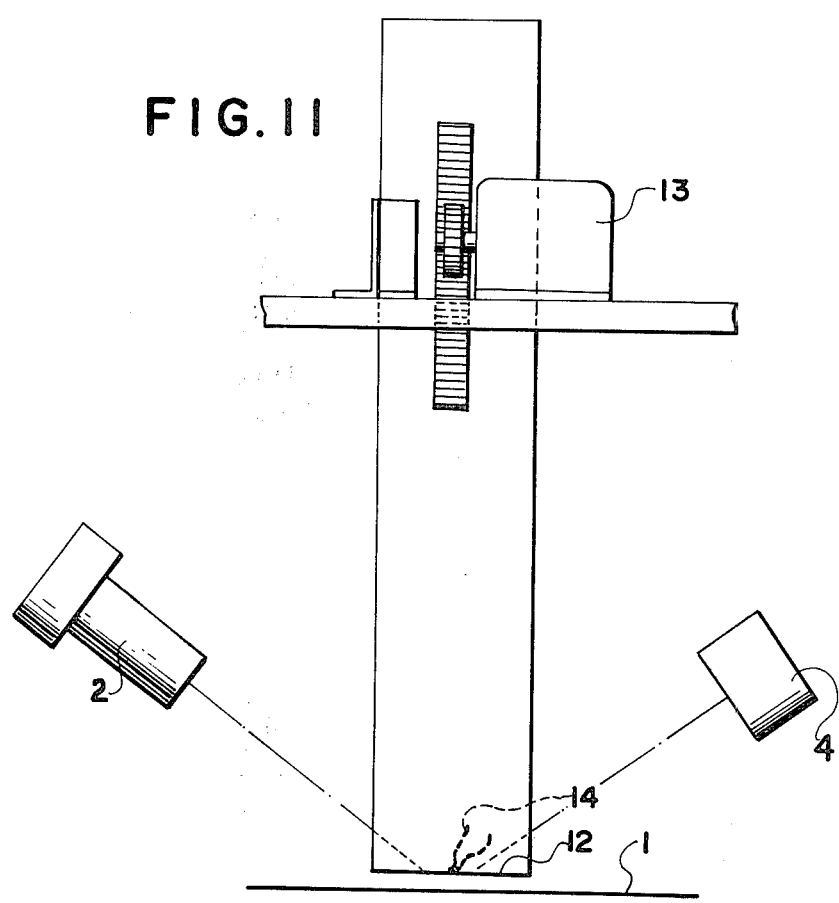
FIG. 11 is a diagrammatic elevation view of still another embodiment of the apparatus of this invention having another means for correcting, or checking, the measured values.

It is preferable that the metal sheet 12 have a thickness of 0.2 mm or less, so that the temperature of the metal sheet rapidly becomes the same as that of the material when the metal sheet is brought in contact with the material. The area of the metal sheet 12 should be made larger than the view angle of the radiation thermometer 4. In addition, the emissivity of the surface of the metal sheet should be increased, for example, up to 0.95, by coating the surface with a black paint or other proper means so that the temperature measurement of the metal sheet by radiation can be conducted with good accuracy. Of course, the fields of vision in both directions from the metal sheet, i.e. the direction in which the black body furnace 2 and the radiation thermometer 4 lie in specular symmetry to the normal line, must be maintained. The thus constituted checking, or correcting, means has a very high reliability although it has a very simple structure. If there is a danger that the material may be injured at the time of the contact by the metal sheet 12, in order to avoid such a danger, a modified form of checking means can be employed. As shown in FIG. 11 the same material as the material to be measured is employed as the thin metal sheet and a thermocouple 14 is point-welded on the surface thereof. In the checking or correction, of the temperature being measured the metal sheet is lowered to a position very near to the surface of the material and the temperature of the metal sheet is measured by the thermocouple. It can thus be confirmed that, if the temperature measured by the thermocouple is approximately equal to that measured by the radiation thermometry of this invention, the radiation temperature measurement is being normally carried out by this invention. Thus, in this checking means the true temperature of the material can not be obtained but the operation of the apparatus of this invention can reliably be monitored without injuring the material.

I claim:

1. A method for the simultaneous measurement of both the temperature and emissivity of a heated material which comprises the steps of; positioning a black body furnace and a radiation thermometer spaced from each other in the direction of the surface of the heated material in specular symmetry to a line normal to the surface of the heated material, the radiation thermometer having a detector with a wavelength band selected such that the surface of the heated material has specular reflection characteristics in the band; changing the radiation energy emitted from said black body furnace and detecting the radiation energies before and after the change by means of the radiation thermometer and simultaneously detecting the temperature of the black body furnace by a means for detecting temperature; determining the emissivity of the heated material by the use of the two detected radiation energies and the temperature of the black body furnace; and then determining the surface temperature of the heated material from the emissivity.

2. A method according to claim 1 in which the wavelength band of the detector is such that the extent of the angle in which the reflection energy intensity is more than 1/10 of the peak value of the radiation energy intensity is 5° or less.

3. A method according to claim 1 in which the simultaneous measurement is conducted while the heated material is being moved.

4. A method according to claim 1 in which the simultaneous measurement is carried out while the heated material is at a standstill.

5. A method according to claim 1 in which the heated material is heated metal, said black body furnace and said radiation thermometer are at an angle in the range from 70° to 85° to the normal line, the heated material is at a temperature slightly higher than room temperature and the simultaneous measurement is carried out in the atmosphere.

6. A method according to claim 1 in which the temperature of said black body furnace is controlled so as to be kept constant.

7. A method for the simultaneous measurement of both the temperature and emissivity of a heated material which comprises the steps of; positioning first and second black body furnaces and first and second mirrors spaced from each other in the direction of the surface of the heated material with first black body furnace and the second mirror in specular symmetry to a line normal to the surface of the heated material, and with the second black body furnace and the first mirror in specular symmetry to the normal line and the optical axes of the first and second black body furnaces intersecting at the same point on the surface of the heated material; controlling the first and second black body furnaces so that they are at different temperatures from each other; alternately directing the radiation energy emitted from the first black body furnace and reflected by the second mirror and the radiation energy emitted from the second black body furnace and reflected by the first mirror into the detector of a radiation thermometer to detect the radiation energies and simultaneously detecting the temperature of each of the first and second black body furnaces by a means for detecting temperature, the radiation thermometer having a detector with a wavelength band selected from such that the surface of the heated material has specular reflection characteristics in the band; determining the emissivity of the heated material by the use of the radiation energies and the temperatures of the first and second black body furnaces; and then determining the temperature of the heated material from the emissivity.

8. A method according to claim 7 in which the wavelength band of the detector is such that the extent of the angle in which the reflection energy intensity is more than 1/10 of the peak value of the radiation energy intensity is 5° or less.

9. A method according to claim 7 in which the simultaneous measurement is conducted while the heated material is being moved.

10. A method according to claim 7 in which the simultaneous measurement is carried out while the heated material is at a standstill.

11. A method according to claim 1 in which the heated material is a heated metal, each of said first and second black body furnaces and each of said first and second mirrors are at an angle in the range from 70° to 85° to the normal line, the heated material is at a temperature slightly higher than room temperature and the simultaneous measurement is carried out in the atmosphere.

12. An apparatus for the simultaneous measurement of both the temperature and emissivity of a heated material which comprises; first and second black body furnaces and first and second mirrors spaced from each other in the directions of the surface of the heated material with the first black body furnace and the second mirror in specular symmetry to a line normal to the surface of the heated material, and the second black body furnace and the first mirror are in specular symmetry to the normal line and the optical axes of the first and second black body furnaces intersect at the same point on the surface of the heated material; means for detecting the temperature of each of the black body furnaces; means for controlling temperature connected to each of the first and second black body furnaces; a radiation thermometer having a detector the wavelength band of which is selected such that the surface of the heated material has specular reflection characteristics in the band; means on the axis of images reflected from said mirrors for alternately directing radiation energy emitted by the first black body furnace and reflected by the second mirror and the radiation energy emitted by the second black body furnace and reflected by the first mirror into the radiation thermometer; and calculating means connected to said radiation thermometer and said temperature detecting means for calculating the emissivity and the temperature of the heated material from the radiation energies detected by the detector and the temperatures of the first and second black body furnaces.

13. An apparatus according to claim 12 further comprising a checking means consisting essentially of a thin metal plate having a sufficiently large emissivity and a driving means for elevating the thin metal plate and lowering said plate in the direction of the normal line to bring it into contact with the surface of the heated material at said point of intersection.

14. An apparatus according to claim 12 further comprising a checking means consisting essentially of a thin metal plate having a thermocouple thereon and a driving means for elevating the thin metal plate and lowering the same near to the surface of the heated material in the direction of the normal line.

15. An apparatus for the simultaneous measurement of both the temperature and emissivity of a heated material which comprises; a black body furnace and a radiation thermometer spaced from each other in the direction of the surface of the heated material and in specular symmetry to a line normal to the surface of the heated material, said radiation thermometer having a detector for detecting radiation energy with a wavelength band selected such that the surface of the heated material has a specular reflection characteristic in the band; a means for detecting the temperature of said black body furnace; a shielding disc in front of the opening of the black body furnace and movable for blocking the radiation energy emitted from the opening, the shielding disc having a water-cooling means for keeping the temperature of the disc lower than that of the black body furnace; and calculating means connected to said radiation thermometer and said temperature detecting means for calculating the emissivity and the temperature of the heated material from the temperature of the black body furnace and the values of the radiation energies detected by the radiation thermometer when the opening is covered by the shielding disc and when the opening is exposed to the surface of the heated material.

16. An apparatus according to claim 15 further comprising a checking means consisting essentially of a thin metal plate having a sufficiently large emissivity and a driving means for elevating the thin meatl plate and lowering said plate in the direction of the normal line to bring it into contact with the surface of the heated material at the point of specular reflection.

17. An apparatus according to claim 15 further comprising a checking means consisting essentially of a thin metal plate having a thermocouple thereon and a driving means for elevating the thin metal plate and lowering the same near to the surface of the heated material in the direction of the normal line.

18. An apparatus according to claim 15 in which said black body furnace has a means for controlling temperature of the black body furnace to keep the temperature constant.

* * * * *